(12) United States Patent
Kesh

(10) Patent No.: US 8,205,389 B1
(45) Date of Patent: Jun. 26, 2012

(54) WINDOW SEAL ASSEMBLY HAVING A T-SHAPED TRIM MEMBER

(75) Inventor: Christopher L. Kesh, West Bloomfield, MI (US)

(73) Assignee: Henniges Automotive Sealing Systems North America, Inc., Farmington Hills, MI (US)

( * ) Notice: Subject to any disclaimer, the term of this patent is extended or adjusted under 35 U.S.C. 154(b) by 0 days.

(21) Appl. No.: 10/130,088

(22) PCT Filed: Nov. 13, 2000

(86) PCT No.: PCT/US00/31074
§ 371 (c)(1),
(2), (4) Date: Sep. 26, 2002

(87) PCT Pub. No.: WO01/34933
PCT Pub. Date: May 17, 2001

(51) Int. Cl.
*E05D 15/16* (2006.01)
(52) U.S. Cl. ............... 49/440; 49/490.1; 49/475.1
(58) Field of Classification Search ............. 49/490.1, 49/475.1, 495.1, 440, 441
See application file for complete search history.

(56) References Cited

U.S. PATENT DOCUMENTS

| | | | | |
|---|---|---|---|---|
| 3,742,649 A | * | 7/1973 | Dochnahl | .................. 49/441 |
| 3,744,201 A | * | 7/1973 | Dochnahl | ............. 52/204.597 |
| 4,263,750 A | | 4/1981 | Hein | |
| 4,355,843 A | | 10/1982 | Murakami | |
| 4,417,419 A | | 11/1983 | Rossie et al. | |
| 4,454,688 A | | 6/1984 | Rest et al. | |
| 4,509,293 A | | 4/1985 | Ufrecht et al. | |
| 4,568,119 A | | 2/1986 | Minami et al. | |
| 4,611,850 A | | 9/1986 | Fujikawa | |
| 4,621,469 A | | 11/1986 | Kruschwitz | |
| 4,625,459 A | * | 12/1986 | Warner | .................. 49/489.1 |
| 4,640,066 A | | 2/1987 | Hayashi et al. | |
| 4,656,784 A | * | 4/1987 | Brachmann | ............. 49/490.1 |
| 4,674,247 A | | 6/1987 | Hayashi et al. | |
| 4,681,712 A | * | 7/1987 | Sakakibara et al. | .......... 264/440 |
| 4,919,471 A | | 4/1990 | Seino et al. | |
| 4,947,586 A | | 8/1990 | Mesnel et al. | |
| 4,950,019 A | | 8/1990 | Gross | |
| 4,989,315 A | * | 2/1991 | Mesnel et al. | ............. 29/527.2 |
| 5,001,867 A | | 3/1991 | Dupuy | |
| 5,010,689 A | | 4/1991 | Vaughan | |
| 5,014,464 A | | 5/1991 | Dupuy et al. | |

(Continued)

FOREIGN PATENT DOCUMENTS

DE   8121018   1/1982

(Continued)

OTHER PUBLICATIONS

International Search Report, Apr. 26, 2001, 5 pages.

(Continued)

*Primary Examiner* — Gregory J. Strimbu
(74) *Attorney, Agent, or Firm* — Howard & Howard Attorneys PLLC

(57) ABSTRACT

A window seal assembly having glass run channels (134, 210), outer belt seals (300) and a T-shaped trim member (128). The window seal assembly eliminates the need for joints, seems, metal fasteners and end caps resulting in an improved aesthetic appearance as well as enhanced window seating. The trim member (128) can having various finishes such as low gloss black, high gloss black and chrome.

20 Claims, 2 Drawing Sheets

U.S. PATENT DOCUMENTS

| | | | |
|---|---|---|---|
| 5,032,444 A | 7/1991 | Desir, Sr. | |
| 5,038,521 A | 8/1991 | Andrzejewski et al. | |
| 5,054,241 A | 10/1991 | Mishima et al. | |
| 5,067,281 A | 11/1991 | Dupuy | |
| 5,072,546 A | 12/1991 | Ogawa | |
| 5,088,787 A | 2/1992 | Gross | |
| 5,106,149 A | 4/1992 | Glossop, Jr. et al. | |
| 5,129,193 A | 7/1992 | Karwande | |
| 5,147,105 A | 9/1992 | Ono et al. | |
| 5,150,542 A | 9/1992 | Hannya et al. | |
| 5,168,668 A | 12/1992 | Mishima et al. | |
| 5,174,066 A | 12/1992 | Dupuy | |
| 5,199,761 A | 4/1993 | Dannecker et al. | |
| 5,261,206 A * | 11/1993 | Mesnel et al. | 52/716.1 |
| 5,261,721 A | 11/1993 | Conger et al. | |
| 5,423,147 A | 6/1995 | Dupuy | |
| 5,437,124 A | 8/1995 | Ahlfeld et al. | |
| 5,449,544 A | 9/1995 | Ogawa et al. | |
| 5,474,729 A | 12/1995 | Yada | |
| 5,475,947 A | 12/1995 | Dupuy | |
| 5,493,814 A | 2/1996 | Christian | |
| 5,538,314 A | 7/1996 | Young et al. | |
| 5,548,929 A | 8/1996 | Larsen et al. | |
| 5,566,510 A | 10/1996 | Hollingshead et al. | |
| 5,582,895 A | 12/1996 | Dupuy et al. | |
| 5,628,150 A * | 5/1997 | Mesnel | 49/440 |
| 5,635,274 A | 6/1997 | Chihara et al. | |
| 5,651,217 A | 7/1997 | Mesnel | |
| 5,651,578 A * | 7/1997 | Mistopoulos et al. | 296/146.9 |
| 5,702,148 A | 12/1997 | Vaughan et al. | |
| 5,707,695 A | 1/1998 | Ramanujam | |
| 5,732,509 A | 3/1998 | Buehler et al. | |
| 5,743,047 A | 4/1998 | Bonne et al. | |
| 5,755,071 A | 5/1998 | Drozd | |
| 5,779,956 A | 7/1998 | Hollingshead et al. | |
| 5,791,088 A | 8/1998 | Martinelli et al. | |
| 6,128,859 A | 10/2000 | Vance | |
| 6,189,198 B1 * | 2/2001 | Keeney et al. | 29/527.4 |
| 6,409,251 B1 | 6/2002 | Kaye et al. | |

FOREIGN PATENT DOCUMENTS

| | | |
|---|---|---|
| DE | 3300660 | 9/1983 |
| DE | 3512973 | 11/1985 |
| DE | 4018743 | 1/1991 |
| DE | 19528630 | 1/1996 |
| DE | 69705875 | 9/1997 |
| DE | 19736899 | 3/1999 |
| DE | 19811362 | 9/1999 |
| DE | 19845422 | 4/2000 |
| DE | 10134465 | 12/2002 |
| EP | 182319 | 5/1988 |
| EP | 322 949 | 7/1989 |
| JP | 9-240283 | 9/1997 |
| WO | WO 9727377 A1 | 7/1997 |
| WO | WO 00/73097 A1 | 12/2000 |
| WO | WO 01/34933 | 5/2001 |

OTHER PUBLICATIONS

European Examination Report dated Jun. 24, 2003 from related 00978554.4.

European Search Report dated Mar. 24, 2003 from related 00978554.4.

International Preliminary Examination Report dated Nov. 15, 2003 from related PCT/US00/31074.

International Preliminary Examination Report dated Jan. 25, 2002 from related PCT/US00/31074.

Written Opinion dated Oct. 4, 2001 from related PCT/US00/31074.

Assembly drawing C05 for profile 3518100 including profiles 3518102 to 3518105 (release date Feb. 22, 1989) and detailed drawing with reference numerals—14 pgs.

Detailed drawing Co3 of profiled 3518104 (release date Jan. 22, 1989) and detailed drawing with reference numerals—11 pgs.

Two photographs from Volvo 760, well strip, sectional view of a Volvo 760 window seal having the profile No. 3518101 and a side view of a Volvo 760 vehicle 1 pg. May 9, 2006.

"Standard, FPE team up on window modules", Rubber & Plastics News, Mar. 8, 1999 article.

"Standard's module speeds assembly", two pages, newspaper article, Feb. 22, 1999, Rubber & Plastics News.

Brockhaus Enxyklopadie, dated 1972, 2 pgs., cover page and p. 164.

Export note dated Jan. 15, 1992 of Walter Klein for delivery of 410874 from Germany to Belgium, 1 pg.

Invoice dated Jan. 15, 1992 from Walter Klein Wuppertal GmbH (WKW) for delivery of the window seal having the profile No. 3518101, 1 pg.

Report of visit by Volvo representative to Walter Klein dated Oct. 18, 1988, 1 pg.

Web pages from http://www.gencorp.com/vs.html, dated Mar. 21, 2000, "Vehicle Sealing", 3 pages.

* cited by examiner

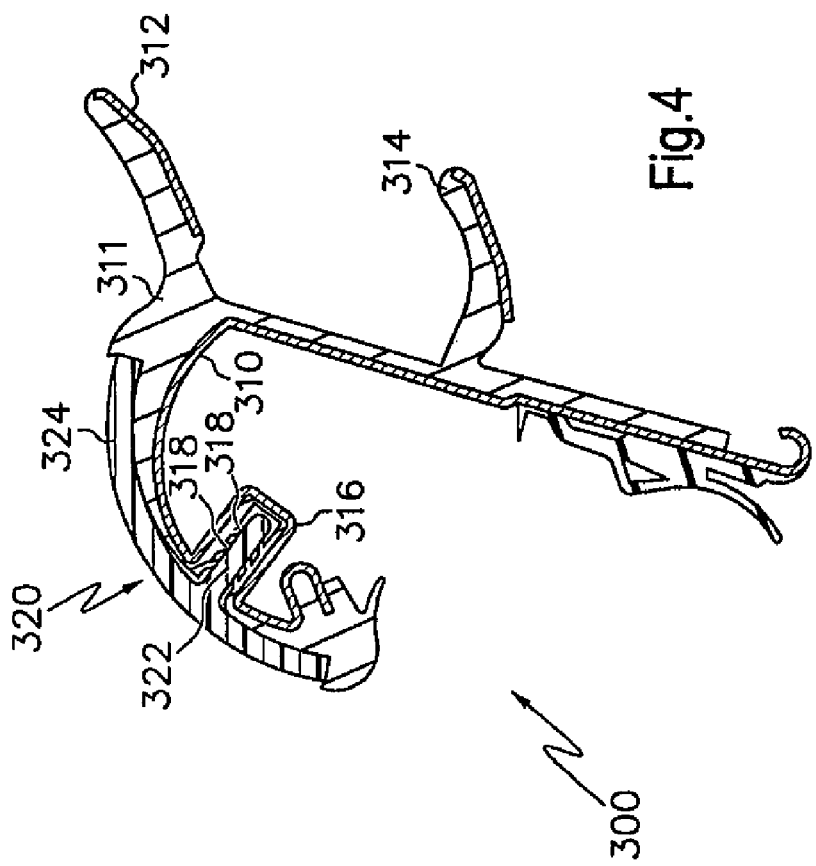
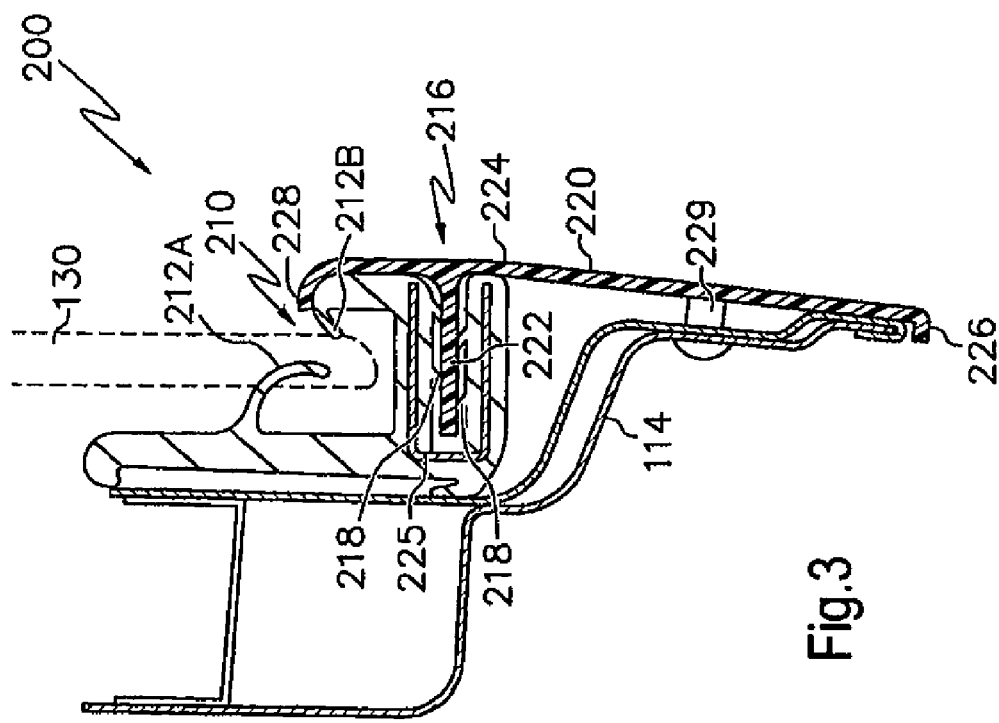

US 8,205,389 B1

WINDOW SEAL ASSEMBLY HAVING A T-SHAPED TRIM MEMBER

FIELD OF THE INVENTION

The present invention relates to a window seal assembly mountable to a frame of a vehicle for providing a seal between a moveable window and the frame and more particularly, but not exclusively, to an improved vehicle greenhouse window seal module having a die cast mold or trim member which is used in conjunction with an extruded rubber belt surrounding the greenhouse window.

BACKGROUND OF THE INVENTION

In the design of modern vehicles such as automobiles, it is known to mount the windows in a substantially flush manner with respect to the vehicle in order to provide an attractive and streamlined appearance. One major disadvantage of typical prior art flush mounted window seal assemblies is that they generally require multiple pieces which need to be assembled together, thus requiring additional assembly time and assembly line space. Another disadvantage to these multi-piece window assemblies is that they result in multiple joints and seams as well as requiring multiple fasteners, weatherstrips and endcaps. With respect to aesthetics, prior art window seal assemblies have the disadvantages of a reduced daylight opening and an increase in the amount of the visible weatherstrips. In addition, a separate decorative molding is typically required in order to produce a more aesthetically pleasing window module. Thus it is desired to produce a one piece window seal assembly which requires no additional assembly for installation into the door and results in elimination of joints, seams and endcaps and a reduction in fasteners while providing for an aesthetically pleasing window module.

SUMMARY OF THE INVENTION

The present application discloses embodiments of a window seal assembly. One described embodiment provides a seamless daylight opening module (DLO) which includes glass run channels, outer belt seals and a full surround die cast piece. The embodiment results in the elimination of joints, seams, metal fasteners and endcaps, resulting in an improved aesthetic appearance as well as enhanced window sealing and an increase in the daylight opening. The module may be shipped and installed as a combined unit reducing assembly time and assembly line space. The unique die cast piece may comprise various finishes such as low gloss black, high gloss black and chrome. With respect to maintenance, the glass runs and outerbelts may be replaced independently of the entire assembly.

BRIEF DESCRIPTION OF THE FIGURES

For a better understanding of the invention an embodiment will be described by way of example, with reference to the accompanying drawings, in which:

FIG. 3 is a cross-sectional view of the window seal assembly shown in the direction 3-3 of FIG. 1; and FIG. 4 is a cross-sectional view of the window seal assembly shown in the direction 4-4 of FIG. 1.

DETAILED DESCRIPTION OF THE INVENTION

Figure 1:
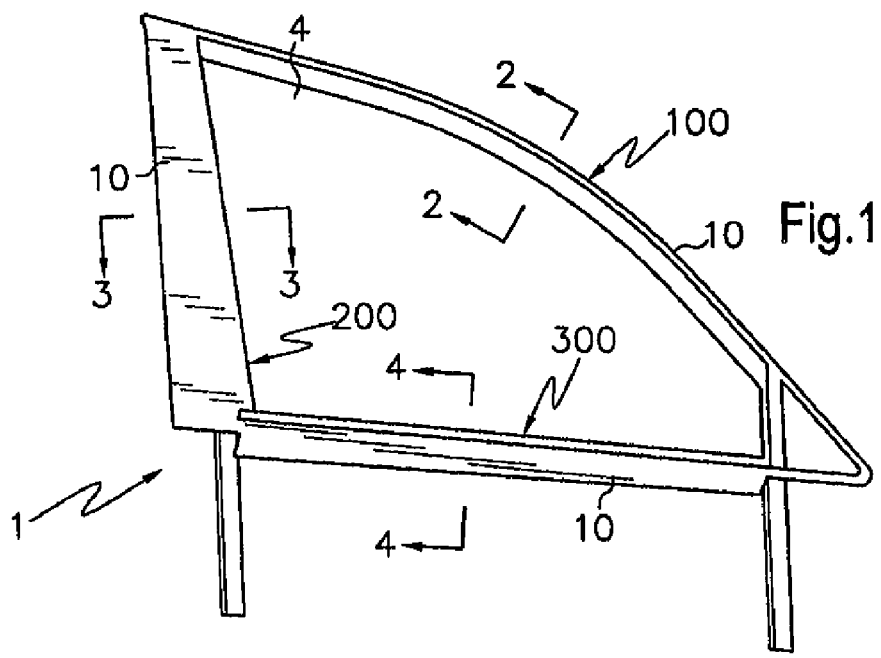
FIG. 1 shows a front view of the window seal assembly in accordance with the present invention shown in use for a front door module.

FIG. 1 is a schematic view of a front side door assembly of a vehicle such as an automobile which may incorporate sealing units according to the various embodiments of the invention. The front side door assembly is generally designated at 1 and includes a window 4 which is movable in a vertical direction. As is well known in the art, the window 4 is slidably received in vertical guide tracks in the door frame so as to be flush or substantially flush with the adjacent vehicle structure when the window is in its closed position. When the window is closed, its edges are adapted to be received within and engaged by the window seal assembly 10 or seamless daylight opening module of the present embodiment. The window seal assembly 10—functions to provide a seal between the window and the adjacent vehicle door structure; to secure the window when the vehicle is traveling; and to provide an aesthetically pleasing appearance. For a front door module as shown in FIG. 1, the window seal assembly 10—comprises three main sections: the door frame header section 100, the B-Pillar section 200, and the glass outer belt section 300, which are shown in more detail in FIGS. 2-4, respectively.

Figure 2:
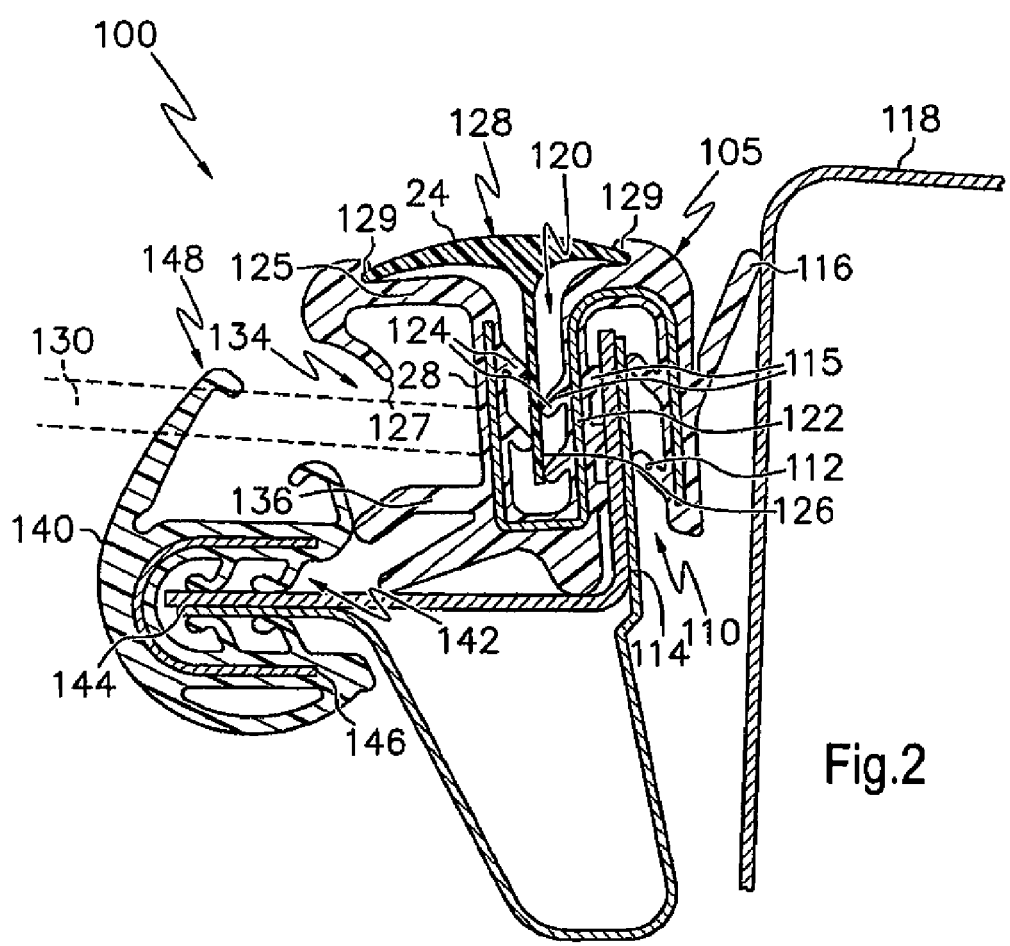
FIG. 2 is a cross-sectional view of the window seal assembly shown in the direction 2-2 of FIG. 1.

As shown in FIG. 2, the front door frame header section 100 comprises a first sealing member 105 and a second sealing member 140. The first sealing member 105 includes a first U shaped channel 110, a second U shaped channel 120, and a glass run channel 134. The first U shaped channel 110 has finger-like projections 112 protruding from the inner sidewalls of the channel for retaining and sealing a pinch welded door frame 114 of a vehicle (not shown). An outer arm 116 laterally extends from the sealing member 105 for sealing the outer door or roof frame 118 of the vehicle. The second U shaped channel 120 is positioned in an inverted relationship with respect to the first U shaped channel 110, i.e., such that the openings of each channel face opposite directions. The channels 110,120 share a common inner wall 115 such that they cooperate to form a generally S cross-sectional shape. Positioned within the interior of the sealing member 105 is an internal S shaped reinforcement member 122.

The sealing member 105 further comprises a T shaped trim member 128 which has a lower end or stem 126 received within the second U shaped channel 120 and which is secured by finger-like projections 124 which extend from the interior walls of the channel. The upper portion or tee end 24 has one end received within a groove 129 formed in the outer wall of the first U shaped channel, and the second end is received within a groove 129 of an arm 125 extending perpendicular from the outer wall 28 of the second U shaped channel 120. The arm 125 together with the outer wall 28 of the second channel 120 and projection 136 which extends from the outer wall of the second channel, together form a glass run channel 134 for receiving a movable glass run 130.

The sealing member 105 further comprises a glass run channel 134 for receiving a glass run 130. Channel 134 has one channel wall formed by arm 125 which extends perpendicular from the wall of the second channel 120, and the opposite channel wall is formed by the projection 136 which extends from the lower end of the U shaped channel 120. Arm 125 has a lip 127 extending therefrom for being in sealing engagement with a movable glass run 130. The second channel 120 further comprises several finger-like projections 124 for receiving and retaining the stem 126 of a T shaped die cast part 128. The T portion 24 of the die cast part 128 is received within grooves 129 of the sealing member 105, provides structural support to the arm 125. The door frame header section further comprises a second-U shaped part 140 having a U shaped channel 142 for receiving a distal end 144 of the door frame with an internal U shaped reinforcement member 146 encased in extruded rubber. The second part 140 has an exterior armlike projection 148 extending from the channel for sealing the glass run 130.

The sealing member 105 may comprise a flexible, durable polymeric material or suitable thermoplastic or thermoplastic elastomeric material such as EPDM which is a copolymer of ethylene and propylenediene. The sealing member 105 may be formed by extrusion or other suitable method. The T shaped trim member 128 is preferably a die cast part and is preferably comprised of zinc, PCABS or plastic materials. The trim member 128 may additionally be powder coated or painted to the desired color.

As shown in FIG. 1, the window seal assembly 10 further comprises a B pillar section 200. The B pillar section 200 as best shown in FIG. 3, comprises a glass run U-shaped channel 210 formed of extruded rubber and having opposed finger like projections 212A, 212B for sealing the glass run 130. The B pillar section 200 is secured to the door frame 114. The B pillar section 200 further comprises a trim channel 216 located perpendicular to the glass run channel 210 and having opposed finger-like projections 218 for receiving and retaining the leg 222 of a trim member 220 within the channel 216. The trim channel 216 preferably has a U shaped reinforcement member 225 embedded therein. The trim member 220 has an elongated T shaped portion 224 having ends 226,228 which curve about the door frame 114 and the B pillar section 200, respectively. The trim member 220 may be further fastened to the door frame 114 via fasteners 229. The trim member 220 preferably is die cast metal which may be finished a number of aesthetically pleasing ways such as low gloss black, high gloss black, and chrome.

As shown in FIG. 1, the window seal assembly 10 further comprises a glass outer belt section 300. As shown in more detail in FIG. 4, the glass outer belt section 300 of the window assembly comprises an inverted J-shaped reinforcement member 310 with extruded rubber 311 molded thereto, and further comprises projections 312,314 forming the outer belt seal attached thereto. The curved portion of the reinforcement member 310 forms a U shaped channel 316 which has an extruded rubber inner layer with finger-like projections 318 extending therefrom for receiving the leg 322 of a trim member 320. The leg 322 of the trim member is connected to an integrally formed curved piece 324 which forms the decorative trim.

The above three sections 100,200,300 are connected together to form the window seal assembly for front door module as shown in FIG. 1.

The above described window seal assembly is an improved design over the prior art resulting in a module shipped as a combined molding-glassrun-weatherstrip which allows for reduced installation labor and improved sealing. The trim member is a single piece die casting which is made with no exposed joints on the molding. The appearance of the seal has been improved since the die cast part may comprise various attractive finishes as well as reducing the amount of visible rubber.

While what has been described constitutes presently preferred embodiments, the invention could take numerous other forms. For example, although the preferred embodiments are described in connection with a movable window of a front automobile door, it may be utilized in connection with any movable window of any vehicle in other applications. Also the particular crosssectional shape and configuration of the sealing member can be varied in many ways without departing from the invention. Because the invention can take on numerous other forms, it should be recognized that the invention should only be limited insofar as is required by the scope of the following claims.

I claim:

1. A window seal assembly mountable to a frame of a vehicle for providing a seal between a moveable window and the frame, said assembly comprising:
   an elongated sealing member formed of a flexible material and having an exterior surface;
   said sealing member having a first channel defining a first base and two sidewalls extending from said first base presenting a first opening for mounting the assembly to the frame;
   said sealing member having a second channel defining a second base and two sidewalls extending from said second base presenting a second opening facing said exterior surface with said second channel positioned in an inverted relationship with respect to said first channel so that said openings of said channels face in substantially opposite directions;
   one of said sidewalls of said first channel corresponding to one of said sidewalls of said second channel;
   said sealing member having a glass run channel positioned in an orthogonal relationship with respect to said first and second channels with said glass run channel defining a third base, a first channel wall, and a second channel wall spaced from said first channel wall with said first and second channel walls extending from said third base in a substantially parallel relationship and generally orthogonal to at least one of said sidewalls for receiving a portion of the moveable window between said first and second channel walls;
   a sealing lip extending from at least one of said first and second channel walls for selectively engaging the portion of the moveable window;
   an internal reinforcement member embedded within said first base and at least a portion of said sidewalls extending from said first base of said sealing member for extending at least partially about said frame; and
   a trim member having an exterior end abutting at least a portion of said exterior surface of said sealing member and covering said second opening for creating a substantially flush appearance;
   said trim member having only a single stem extending generally perpendicularly from said end with said single stem received in said second channel of said sealing member and extending generally parallel to at least one of said sidewalls extending from said second base of said second channel, at least one of said sidewalls extending from said first base of said first channel, and said third base of said glass run channel.

2. The window seal assembly as claimed in claim 1, wherein said trim member has a T-shaped cross-section with a stem of said T-shaped cross-section of said trim member defining said single stem and an upper portion of said T-shaped cross-section of said trim member defining said exterior end.

3. The window seal assembly as claimed in claim 2, wherein said exterior surface of said sealing member includes at least one groove and said upper portion of said T-shaped cross-section of said trim member engages said groove for creating the substantially flush appearance.

4. The window seal assembly as claimed in claim 1, wherein said trim member comprises a material selected from zinc, plastic and polychlorinated azobenzenes.

5. The window seal assembly as claimed in claim 1, wherein said internal reinforcement member is further defined as a first internal reinforcement member and said window seal assembly further includes a second internal reinforcement member embedded within said second base and at least a portion of said sidewalls extending from said second base of said sealing member to at least partially capture said single stem of said trim member.

6. The window seal assembly as claimed in claim 5, wherein said first and second internal reinforcement members form a substantially S-shaped configuration.

7. The window seal assembly as claimed in claim 5, wherein said first and second internal reinforcement members are integrally formed as a single unit.

8. The window seal assembly as claimed in claim 1, wherein said first and second channels are each substantially U-shaped.

9. The window seal assembly as claimed in claim 1, wherein said exterior surface of said sealing member includes grooves flanking said second opening and said exterior end of said trim member includes opposing edges each engaging a respective one of said grooves for creating the substantially flush appearance.

10. The window seal assembly as claimed in claim 1, wherein said exterior surface of said sealing member includes at least one groove and said exterior end of said trim member engages said groove for creating the substantially flush appearance.

11. The window seal assembly as claimed in claim 1, wherein said trim member is removable from said second channel of said sealing member.

12. A window seal assembly mountable to a frame of a vehicle for providing a seal between a moveable window and the frame, said assembly comprising:
    an elongated sealing member formed of a flexible material and having a first channel defining a first base and two sidewalls extending from said first base presenting a first opening for mounting the assembly to the frame;
    said sealing member having a second channel defining a second base and two sidewalls extending from said second base presenting a second opening with said second channel positioned in an inverted relationship with respect to said first channel so that said openings of said channels face in substantially opposite directions;
    one of said sidewalls of said first channel corresponding to one of said sidewalls of said second channel;
    said sealing member having a glass run channel positioned in an orthogonal relationship with respect to said first and second channels with said glass run channel defining a third base, a first channel wall, and a second channel wall spaced from said first channel wall with said first and second channel walls extending from said third base in a substantially parallel relationship and generally orthogonal to at least one of said sidewalls for receiving a portion of the moveable window between said first and second channel walls;
    a sealing lip extending from at least one of said first and second channel walls for selectively engaging the portion of the moveable window; and
    a trim member having an exterior end abutting at least a portion of an exterior surface of said sealing member;
    said trim member having only a single stem extending generally perpendicularly from said end with said single stem received in said second channel of said sealing member and extending generally parallel to at least one of said sidewalls extending from said second base of said second channel, at least one of said sidewalls extending from said first base of said first channel, and said third base of said glass run channel.

13. The window seal assembly as claimed in claim 12, wherein said first and second channels are each substantially U-shaped.

14. The window seal assembly as claimed in claim 12, wherein said glass run channel is generally U-shaped.

15. A window seal assembly mountable to a frame of a vehicle for providing a seal between a moveable window and the frame, said assembly comprising:
    an elongated sealing member formed of a flexible material and having an exterior surface;
    said sealing member having a first channel defining a first base and two sidewalls extending from said first base presenting a first opening for mounting the assembly to the frame;
    said sealing member having a second channel defining a second base and two sidewalls extending from said second base presenting a second opening facing said exterior surface with said second channel positioned in an inverted relationship with respect to said first channel so that said openings of said channels face in substantially opposite directions;
    one of said sidewalls of said first channel corresponding to one of said sidewalls of said second channel;
    said sealing member having a glass run channel positioned in an orthogonal relationship with respect to said first and second channels with said glass run channel defining a third base, a first channel wall, and a second channel wall spaced from said first channel wall with said first and second channel walls extending from said third base in a substantially parallel relationship and generally orthogonal to at least one of said sidewalls for receiving a portion of the moveable window; and
    a sealing lip extending from at least one of said first and second channel walls for selectively engaging the portion of the moveable window;
    a trim member having an exterior end defining a first distal end and a second distal end spaced from each other with said exterior end being generally transverse to at least one of said sidewalls of at least one of said first and second channels and only a single stem extending generally perpendicularly from said exterior end between said first and second distal ends with said single stem received in said second channel of said sealing member and extending generally parallel to at least one of said sidewalls extending from said second base of said second channel, at least one of said sidewalls extending from said first base of said first channel, and said third base of said glass run channel.

16. The window seal assembly as claimed in claim 15, wherein said first and second channels are substantially U-shaped.

17. The window seal assembly as claimed in claim 15, wherein said exterior surface of said sealing member includes at least one groove and one of said first and second distal ends of said exterior end of said trim member engages said groove for creating a substantially flush appearance.

18. The window seal assembly as claimed in claim 15, wherein said exterior surface of said sealing member includes grooves flanking said second opening and said first and second distal ends of said exterior end of said trim member each engage said grooves for creating a substantially flush appearance.

19. The window seal assembly as claimed in claim 15, wherein said trim member has a T-shaped cross-section with a stem of said T-shaped cross-section of said trim member defining said single stem and an upper portion of said T-shaped cross-section of said trim member defining said exterior end.

20. The window seal assembly as claimed in claim 19, wherein said exterior surface of said sealing member includes at least one groove and said upper portion of said T-shaped cross-section of said trim member engages said groove for creating a substantially flush appearance.

\* \* \* \* \*